(12) United States Patent
Drake et al.

(10) Patent No.: US 6,937,144 B2
(45) Date of Patent: Aug. 30, 2005

(54) REMOTE TIRE PRESSURE MONITORING SYSTEM

(75) Inventors: Marshall Drake, Avon Lake, OH (US); Thomas Christ, Macomb, MI (US)

(73) Assignee: Drakes & Christ, LLC, Avon Lake, OH (US)

( * ) Notice: Subject to any disclaimer, the term of this patent is extended or adjusted under 35 U.S.C. 154(b) by 160 days.

(21) Appl. No.: 10/185,647

(22) Filed: Jun. 28, 2002

(65) Prior Publication Data

US 2003/0006895 A1 Jan. 9, 2003

Related U.S. Application Data

(60) Provisional application No. 60/302,999, filed on Jul. 5, 2001.

(51) Int. Cl.[7] .............................................. B60C 23/00
(52) U.S. Cl. ....................... 340/447; 340/445; 73/146.5
(58) Field of Search ................................ 340/447, 445, 340/448, 5.61, 10.1; 73/146.4, 146.5, 146.8; 116/34 R

(56) References Cited

U.S. PATENT DOCUMENTS

| | | | |
|---|---|---|---|
| 4,510,484 A | 4/1985 | Snyder | |
| 4,554,527 A | 11/1985 | Muller | |
| 5,061,917 A | 10/1991 | Higgs et al. | |
| 5,090,237 A | 2/1992 | Schrumpf et al. | |
| 5,285,189 A | 2/1994 | Nowicki et al. | |
| 5,335,541 A | 8/1994 | Sharpe | |
| 5,353,020 A | 10/1994 | Schurmann | 340/870.31 |
| 5,444,448 A | 8/1995 | Schuermann et al. | 342/42 |
| 5,483,827 A * | 1/1996 | Kulka et al. | 73/146.5 |
| 5,573,611 A * | 11/1996 | Koch et al. | 152/152.1 |
| 5,731,754 A * | 3/1998 | Lee et al. | 340/447 |
| 5,745,049 A | 4/1998 | Akiyama et al. | 340/870.17 |
| 5,808,190 A | 9/1998 | Ernst | |
| 5,825,285 A | 10/1998 | Sawafuji | |
| 5,838,229 A | 11/1998 | Robinson, III | |
| 5,880,363 A | 3/1999 | Meyer et al. | |
| 6,025,777 A * | 2/2000 | Fuller et al. | 340/442 |
| 6,034,597 A | 3/2000 | Normann et al. | |
| 6,043,738 A | 3/2000 | Stewart et al. | |
| 6,441,732 B1 * | 8/2002 | Laitsaari et al. | 340/539.1 |

OTHER PUBLICATIONS

"Michelin System Monitors Tires", *Overdrive*, Nov. 2002, p. 18, by Avery Vise and Tim Barton.
"Michelin Introduces Remote Tire Pressure Monitoring System for Big Tires", http://ca.autos.yahoo.com/0210/11/pim-w.html, Friday Oct. 11.

* cited by examiner

*Primary Examiner*—Donnie L. Crosland
(74) *Attorney, Agent, or Firm*—Rankin, Hill, Porter & Clark LLP

(57) ABSTRACT

A system for monitoring tire pressure of a vehicle or fleet of vehicles includes a check point through which the vehicles pass. A first interrogation component is positioned proximal the check point and tire pressure monitoring devices associated with the tires of the vehicle are in communication with the first interrogation component. An identification tag associated with the vehicle stores data unique to the particular vehicle and is also in communication with the first interrogation component. Likewise, a data collection device communicates with the interrogation component as well. Finally, an alarm communicates with the interrogation component to alert an operator when the tire pressure falls outside a predetermined range.

8 Claims, 2 Drawing Sheets

REMOTE TIRE PRESSURE MONITORING SYSTEM

This patent application claims priority from U.S. Provisional Patent Application, Ser. No. 60/302,999 filed on Jul. 5, 2001.

BACKGROUND OF THE INVENTION

The present invention generally relates to a system and method for monitoring a fleet of vehicles, for example, a fleet of taxi cabs, rental cars, or commercial trucks. More particularly, the invention relates to a tire pressure monitoring system that is used on a fleet of vehicles that must pass over or through a certain location.

Various types of devices monitor and provide indications of tire pressure. These known devices provide tire pressure information collected while the vehicle is moving and displayed to the vehicle driver. Other approaches use additional electronics to calibrate the tire location on the vehicle. These and other remote tire pressure monitoring systems are deficient in several respects. First, the expense and complexity of recalibration to determine the exact tire location is unnecessary when this expense can be eliminated by simply checking the tire pressure on the side of the vehicle with a low pressure alert message. Furthermore, prior systems inadequately address the problem of identifying damaged or non-responding transmitters that monitor tire pressure. Additionally, the prior art does not address problems with overlapping codes among different individual systems, or false pressure readings from the tires of one vehicle being erroneously received and processed by a receiver on another vehicle. These problems are accentuated with a fleet of vehicles. Furthermore, the prior art does not address avoiding excessive power drain for batteries powering the monitoring devices during periods when the tires are not being monitored, or need not be monitored.

Accordingly, it would be desirable to provide a tire pressure monitoring system and method that addresses these problems and concerns.

BRIEF SUMMARY OF THE INVENTION

A system for monitoring tire pressure of a vehicle or fleet of vehicles includes a check point having a first interrogation component, tire pressure monitors, an identification tag associated with the vehicle, a data collection unit and an alarm device. Tire pressure monitoring devices mount to the vehicle selectively communicate with the first interrogation component. The vehicle identification tag also communicates with the first interrogation component. The data collection unit communicates with the first interrogation component as well. Finally, an alarm communicates with the first interrogation component to alert an operator when the tire pressure falls outside a predetermined range.

A method for remotely monitoring the tire pressure of a vehicle or a fleet of vehicles includes interrogating tire pressure monitoring devices mounted to the vehicle, interrogating a vehicle identification device, checking the tire pressure of the tire, and selectively transmitting data to the interrogating devices which communicate with the data collection unit. The method may also include sending wake-up signals to the devices mounted on the vehicle so that those devices are only operative while being interrogated and thereby conserve battery power.

An exemplary embodiment of the invention mounts the interrogation component on a pylon. The tire pressure monitoring devices include a processor receiving an interrogation signal from the first interrogation component, to sample tire pressure, to transmit a unique device identification back to the interrogation component and to alert an operator if the pressure tested is outside a predetermined range.

Additional features and advantages will become apparent from the following description and appended claims.

DETAILED DESCRIPTION OF THE INVENTION

Figure 1:
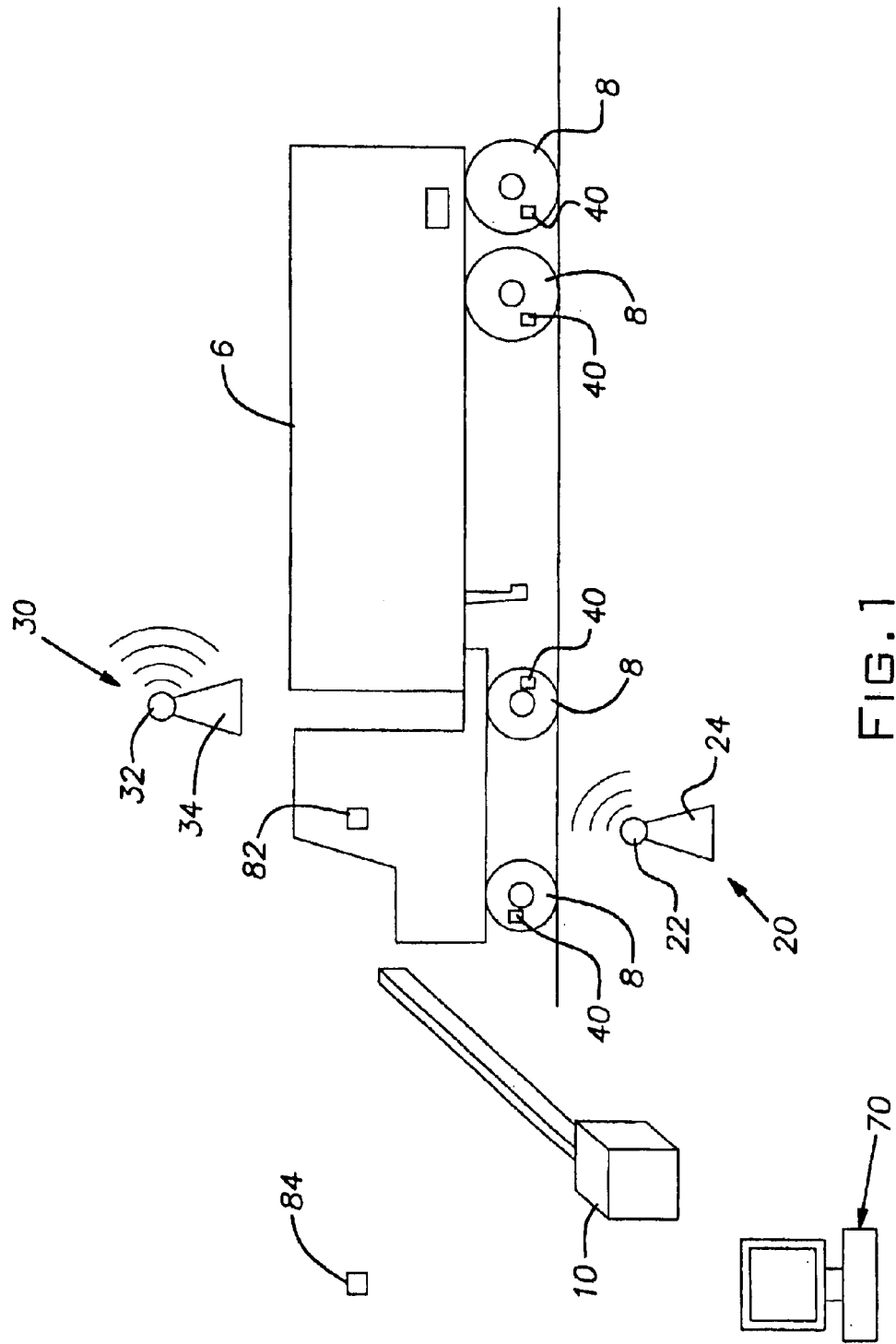
FIG. 1 illustrates a system to monitor tire pressure that can be used in accordance with the teachings of the present invention.

Referring to FIG. 1, a vehicle 6 having tires 8 approaches a natural choke point or check point 10. The vehicle in FIG. 1 is a semi-tractor trailer, however it will be appreciated that any vehicle having its tires monitored is encompassed by the invention. The check point 10 is a location that each vehicle must pass, for example the exit/entrance of a fenced in parking area or garage that holds a fleet of vehicles. The check point need not specifically be the entrance/exit of a parking lot so long as each vehicle being monitored must necessarily pass the check point. By interrogating the vehicle tires at a single location or only a limited number of check points, the vehicle tire pressure may be economically checked using equipment that need not be mounted on every vehicle. This reduces the number of components required in known systems that incorporate much of the monitoring system on the vehicle and typically transmit information to be displayed to the driver. This adds substantial cost to the initial system, as well as increased costs associated with maintenance and upkeep.

As the vehicle advances toward the check point, a first interrogation component 20 transmits a signal to tire pressure monitoring devices or sensors 40 mounted on the tires 8 of the vehicle. The sensors may be any conventional, commercially available tire pressure sensor, or may be particularly modified to suit the needs of the present system. The first interrogation component preferably includes an RF transmitter 22 mounted at a desired height, for example on a pylon 24. The interrogation pylon 24 is positioned at or near the check point so that the tire pressure monitoring devices 40 are interrogated each time the vehicle passes the check point 10. The interrogation begins with the RF transmitter 22 sending a wake-up signal to the tire pressure monitoring devices 40 to restore the tag to an active state. The tire pressure monitoring devices 40 remain in a "sleep" mode prior to receiving the wake-up signal from the RF transmitter 22 to conserve as much battery power as possible.

Figure 2:
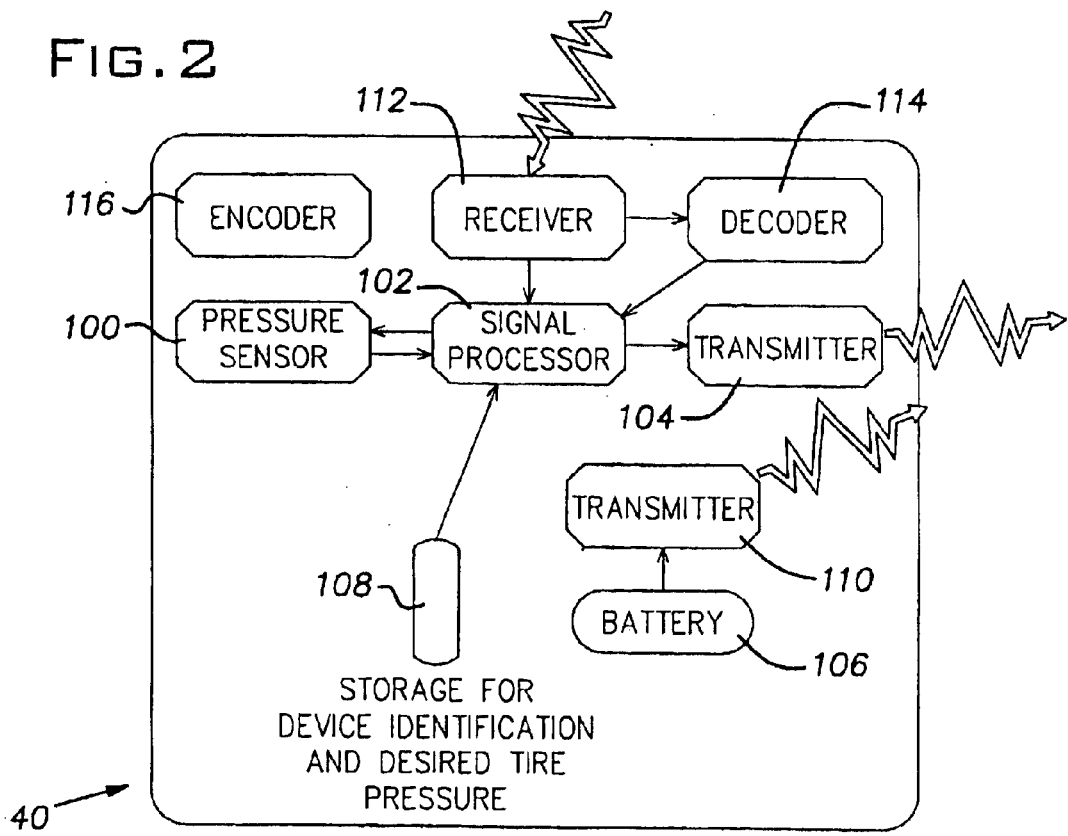
FIG. 2 illustrates a schematic of the tire pressure monitoring device.

Each tire 8 preferably contains a tire pressure monitoring device 40 mounted to it. As shown in FIG. 2, the tire pressure monitoring devices 40 include the following components: a pressure sensor 100, a signal processor 102 responsive to the pressure sensor and operative to produce a tire pressure signal indicative of the tire pressure, and a first transmitter 104 responsive to the signal processor and operative to generate a radio signal indicative of the tire pressure. The tire pressure monitoring device further includes a battery 106, a memory or storage device 108 that retains data relating to device identification and the desired tire pressure, and a second transmitter 110 operatively connected to the battery for generating a signal indicative of the battery life. The tire pressure monitoring device may also include a receiver 112 to receive encoded signals and a decoder 114 to decode the encoded signals. The tire pressure monitoring device may also include an encoder 116 having an application specific integrated circuit to send encoded signals to the first interrogation component 20 or elsewhere. The tire pressure monitoring device also includes processing logic necessary to receive the interrogation signal from the first interrogation component 20, to sample tire pressure, to transmit a unique device identification, and to alert an operator if the pressure is outside of the predetermined range.

The pressure sensor may be any means well known in the art for sensing air pressure. By way of example, the pressure sensor 100, signal processor 102 and the first transmitter 104 are mounted inside of the tire. The battery 106 is an extended life battery powerful enough to power the components of the tire pressure monitoring device. The transmitters 104, 110 may be RF transmitters and or other suitable transmitters that communicate with the transmitter 22 of the first interrogation component 20.

The receiver 112 receives a signal from the first interrogation component 20. Prior to receiving the signal, the tire pressure monitoring device 40 may be in a "sleep" mode, thus conserving battery power. After receiving the wake-up signal, the receiver sends a signal to the decoder 114 if the signal must be decoded, or the receiver send the signal to the signal processor 102 bypassing the decoder. The signal processor 102 then may communicate with the pressure sensor 100. The pressure sensor 100 measures the pressure of the tires and reports back to the signal processor 102. The signal processor receives the desired tire pressure from storage 108 and compares the measured tire pressure to the stored desired tire pressure to determine whether the measured pressure is within an acceptable range. If the measured pressure is outside of the acceptable range, the signal processor 102 communicates with the transmitter 104 and the device identification and a tire pressure "high" or "low" signal is sent to the interrogation component 20.

Furthermore, the battery 106 powers the tire pressure monitoring device 40. The second transmitter 110 communicates with the interrogation component 20 the amount of power left in the battery. If the interrogation component 20 does not receive a communication from the second transmitter 110 or if the communication indicates that the battery does not have an ample amount of life left, the interrogation component 20 can communicate this to an alert device or vehicle dispatch system. This monitors the well-being of the tire pressure monitoring device.

Referring back to FIG. 1, along with the first interrogation component 20, a second interrogation component 30 may also be positioned near the natural choke point 10 on an opposite side of the vehicle 6 as the first interrogation component 20. The second interrogation component includes an RF transmitter 32 mounted on a pylon 34. The second interrogation component interrogates the tire pressure monitoring devices 40 located on the opposite side of the vehicle 6 in much the same fashion as the first interrogation component 20.

The first and second interrogation components 20, 30 also communicate with an RF tag 60 mounted on the vehicle. The RF tag 60 is preferably mounted on a side of the vehicle 6 above the vehicle tires 8. The RF tag stores unique identification data associated with the particular vehicle. The RF tag 60 includes a battery that powers the RF tag and its transmitter. Similarly to the interrogation of the tire pressure monitoring devices 40, the RF tag 60 receives a wake-up call from the interrogation components 20, 30 which, in turn, restores the tag to an active state so that the battery is not drained when the interrogation process is not under way. The RF tag 60 advantageously communicates with the interrogation component 20 thereby delivering data unique to the particular vehicle and also information relating to battery life to the interrogation component.

The tire pressure monitoring devices 40 selectively communicate with the interrogation components 20, 30. The interrogation components 20 send a wake-up signal to the tire pressure monitoring devices 40. In response, the tire pressure monitoring devices 40 monitor the pressure of the associated tire 4. If the tire pressure is outside of a desired range for that tire, then the tire pressure monitoring device sends a signal to the interrogation component 20. The signal from the tire pressure monitoring device 40 to the interrogation component 20 includes data relating whether the tire pressure is outside of the range, be it too high or too low.

If the tire pressure is measured outside of the predetermined range the tire pressure monitoring device preferably communicates with an alarm device to alert the vehicle driver. The alarm device may be mounted on the vehicle as a driver alert 82 or may be located adjacent the check point 10 as an operator alert 84. The alert device informs the vehicle driver, or the operator of the security gate, and/or a data collection device 70 of the unique tire pressure monitoring device identification. This data/information, along with the unique vehicle identification supplied by the RF tag 60 to the interrogation pylon 20, is then transferred to a data collection device 70. The system operator, or the owner of the fleet, is the apprised of the status of the vehicles tires. From this information the exact tire as well as the exact vehicle can be identified so that the problem with the tire pressure can be rectified. As will be appreciated, the problem tire can be immediately attended to, or scheduled for follow-up maintenance if it does not pose an immediate concern.

Furthermore, the data collection device 70 can integrate the collected information with an existing system, such as a vehicle dispatch system or database, to more effectively monitor the tire pressure of a fleet of vehicles. This collected data thereby provides historical data to determine whether corrective action has taken place once the low pressure alert has been processed.

Figure 3:
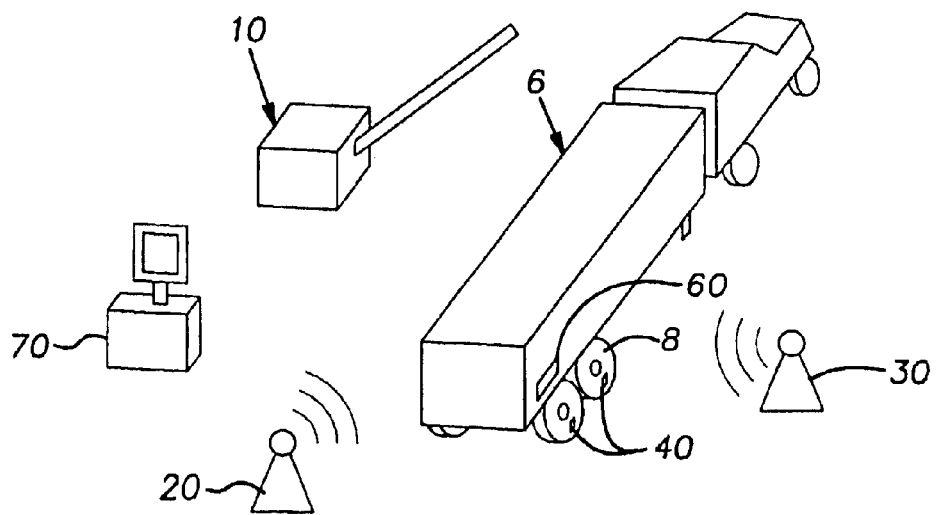
FIG. 3 illustrates the system of FIG. 1 wherein the vehicle to be monitored is passing through the check point.

FIG. 3 illustrates a vehicle 6 passing through a check point 10 between the interrogation components 20, 30. It shows the interrogation components delivering wake-up signals to the RF tag 60 and the tire pressure monitoring devices. It further shows the tire pressure monitoring devices 40 transmitting return signals toward the interrogation components. Moreover, the figure represents the RF tag sending a signal back towards the interrogation pylon.

The invention has been described with reference to the preferred embodiments. Modifications and alterations will occur to others upon a reading and understanding of the present invention. The present invention is intended not only to cover the exemplary embodiments, but also modifications thereof and so far as they fall within the scope of the following claims.

What is claimed is:

1. A system for remotely monitoring the pressure of tires mounted to an associated vehicle, the system comprising:

a check point having a first interrogation component comprising
  a first interrogation component transmitter for transmitting RF wake up signals to tire pressure monitoring devices inside tires mounted on a first side of the vehicle as the vehicle passes the check point, and
  a first interrogation component receiver, and
a second interrogation component spaced apart from the first interrogation component sufficient to allow the vehicle to pass therebetween, the second interrogation component comprising
  a second interrogation component transmitter for transmitting RF wake up signals to tire pressure monitoring devices inside tires mounted on a second side of the vehicle as the vehicle passes the check point, and
  a second interrogation component receiver;
a plurality of tire pressure monitoring devices separately installed inside tires mounted on the first side and the second side of the vehicle, each tire pressure monitoring device comprising
a tire pressure monitoring device receiver for receiving transmitted wake-up RF signals,
a tire pressure sensor for sensing tire pressure,
a storage device that retains identification data relating to the particular tire pressure monitoring device, and
  a predetermined range of desired tire pressures for the tire within which the particular tire pressure monitoring device is mounted,
  a signal processor that compares the tire pressure sensed by the tire pressure sensor to the predetermined range of desired tire pressures retained in the storage device to determine whether the sensed tire pressure is within the predetermined range of desired tire pressures,
  a first tire pressure device transmitter responsive to the signal processor and operative to generate an RF signal to the corresponding first interrogation component receiver or second interrogation component receiver indicative of the identification of the particular tire pressure monitoring device and whether the tire pressure within the tire is too high or too low with respect to the predetermined range of desired tire pressures,
  a tire pressure monitoring device battery;
an RF tag mounted on the first side or the second side of the vehicle, the RF tag comprising
  an RF tag receiver for receiving wake-up RF signals from the first interrogation component transmitter or the second interrogation component transmitter,
  an RF tag storage device that retains unique identification data associated with the vehicle,
  a first RF tag transmitter operatively connected to the RF tag storage device for generating an RF signal to the first interrogation component receiver or the second interrogation component receiver indicative of the unique identification data associated with the vehicle,
  an RF tag battery;
a data collection device in communication with the first interrogation component and the second interrogation component for recording the unique identification data associated with the vehicle transmitted by the first RF tag transmitter and the identification of the particular tire pressure monitoring device and whether the tire pressure within the tire is too high or too low with respect to the predetermined range of desired tire pressures transmitted by the first tire pressure device transmitters; and
an alarm associated with the first interrogation component and the second interrogation component for signaling an operator of the vehicle when tire pressure has been determined to be outside the predetermined range for one or more particularly identified tires.

2. The system according to claim 1 wherein each of the plurality of tire pressure monitoring devices further comprises a second tire pressure device transmitter operatively connected to the tire pressure monitoring device battery for generating an RF signal to the first interrogation component receiver or the second interrogation component receiver indicative of the amount of power left in the tire pressure monitoring device battery.

3. The system according to claim 1 wherein the RF tag further comprises a second RF tag transmitter operatively connected to the RF tag battery for generating an RF signal to the first interrogation component receiver or the second interrogation component receiver indicative of the amount of power left in the RF tag battery.

4. The system according to claim 1 wherein
  each of the plurality of tire pressure monitoring devices further comprises a second tire pressure device transmitter operatively connected to the tire pressure monitoring device battery for generating an RF signal to the first interrogation component receiver or the second interrogation component receiver indicative of the amount of power left in the tire pressure monitoring device battery;
  the RF tag further comprises a second RF tag transmitter operatively connected to the RF tag battery for generating an RF signal to the first interrogation component receiver or the second interrogation component receiver indicative of the amount of power left in the RF tag battery; and
  the alarm associated with the first interrogation component and the second interrogation component signals the operator of the vehicle when one or more of the tire pressure monitoring device batteries does not have an ample amount of life left,
  no communication was received from one or more of the particular tire pressure monitoring devices,
  the RF tag battery does not have an ample amount of life left, or
  no communication was received from the RF tag.

5. A method of monitoring tire pressure on a vehicle comprising:
  providing a check point through which the vehicle must pass, the check point comprising
    a first interrogation component comprising
      a first interrogation component transmitter for transmitting RF wake up signals to tire pressure monitoring devices provided inside tires mounted on a first side of the vehicle as the vehicle passes through the check point, and
      a first interrogation component receiver, and
    a second interrogation component spaced apart from the first interrogation component sufficient to allow the vehicle to pass therebetween, the second interrogation component comprising
      a second interrogation component transmitter for transmitting RF wake up signals to tire pressure monitoring devices provided inside tires mounted on a second side of the vehicle as the vehicle passes through the check point, and
      a second interrogation component receiver;

providing a plurality of tire pressure monitoring devices
separately installed inside tires mounted on the first
side and the second side of the vehicle, each tire
pressure monitoring device comprising
- a tire pressure monitoring device receiver for receiving transmitted wake-up RF signals,
- a tire pressure sensor for sensing tire pressure,
- a storage device that retains
  - identification data relating to the particular tire pressure monitoring device, and
  - a predetermined range of desired tire pressures for the tire within which the particular tire pressure monitoring device is mounted,
- a signal processor that compares the tire pressure sensed by the tire pressure sensor to the predetermined range of desired tire pressures retained in the storage device to determine whether the sensed tire pressure is within the predetermined range of desired tire pressures,
- a first tire pressure device transmitter responsive to the signal processor and operative to generate an RF signal to the first interrogation component receiver or the second interrogation component receiver indicative of the identification of the particular tire pressure monitoring device and whether the tire pressure within the tire is too high or too low with respect to the predetermined range of desired tire pressures, and
- a tire pressure monitoring device battery;

mounting an RF tag on the first side or the second side of the vehicle, the RF tag comprising
- an RF tag receiver for receiving wake-up RF signals from the first interrogation component transmitter or the second interrogation component transmitter,
- an RF tag storage device that retains unique identification data associated with the vehicle,
- a first RF tag transmitter operatively connected to the RF tag storage device for generating an RF signal to the first interrogation component receiver or the second interrogation component receiver indicative of the unique identification data associated with the vehicle, and
- an RF tag battery;

approaching the vehicle toward the check point such that it passes between the first interrogation component and the second interrogation component;

transmitting RF wake up signals from the first interrogation component transmitter to tire pressure monitoring devices provided inside tires mounted on the first side of the vehicle as the vehicle approaches the check point;

transmitting RF wake up signals from the second interrogation component transmitter to tire pressure monitoring devices provided inside tires mounted on the second side of the vehicle as the vehicle approaches the check point;

sensing the tire pressure within each tire mounted to the vehicle;

determining whether the sensed tire pressure is within the predetermined range of desired tire pressures for each tire;

transmitting the unique identification data associated with the vehicle from the first RF tag transmitter to either the first interrogation component receiver or the second interrogation component receiver;

transmitting the identification of the particular tire pressure monitoring devices installed in each tire mounted on the first side of the vehicle to the first interrogation component receiver, and whether the tire pressure sensed within each tire is too high or too low with respect to the predetermined range of desired tire pressures for such tire;

transmitting the identification of the particular tire pressure monitoring devices installed in each tire mounted on the second side of the vehicle to the second interrogation component receiver, and whether the tire pressure sensed within each tire is too high or too low with respect to the predetermined range of desired tire pressures for such tire;

collecting the information transmitted by the RF tag transmitter and the tire pressure monitoring device transmitters in a database; and signaling an operator of the vehicle when
- tire pressure has been determined to be outside the predetermined range for one or more particularly identified tires.

6. The method according to claim 5 wherein each of the plurality of tire pressure monitoring devices transmits a tire pressure monitoring device battery life RF signal to the corresponding first interrogation component receiver or second interrogation component receiver indicative of the amount of power left in the tire pressure monitoring device battery.

7. The method according to claim 5 wherein the RF tag transmits an RF tag battery life RF signal to the corresponding first interrogation component receiver or second interrogation component receiver indicative of the amount of power left in the RF tag battery.

8. The method according to claim 5 wherein
- each of the plurality of tire pressure monitoring devices transmits a tire pressure monitoring device battery life RF signal to the corresponding first interrogation component receiver or second interrogation component receiver indicative of the amount of power left in the tire pressure monitoring device battery;
- the RF tag transmits an RF tag battery life RF signal to the corresponding first interrogation component receiver or second interrogation component receiver indicative of the amount of power left in the RF tag battery; and
- the alarm associated with the first interrogation component and the second interrogation component signals the operator of the vehicle when
  - one or more of the tire pressure monitoring device batteries does not have an ample amount of life left,
  - no communication was received from one or more of the particular tire pressure monitoring devices,
  - the RF tag battery does not have an ample amount of life left, or
  - no communication was received from the RF tag.

* * * * *